Oct. 6, 1959  P. M. ENGLE ET AL  2,907,408
FILTER CONSTRUCTION

Filed May 18, 1956  2 Sheets-Sheet 1

INVENTORS
PAUL M. ENGLE
JOHN R. SWANTON, JR.
BY
ATTORNEY

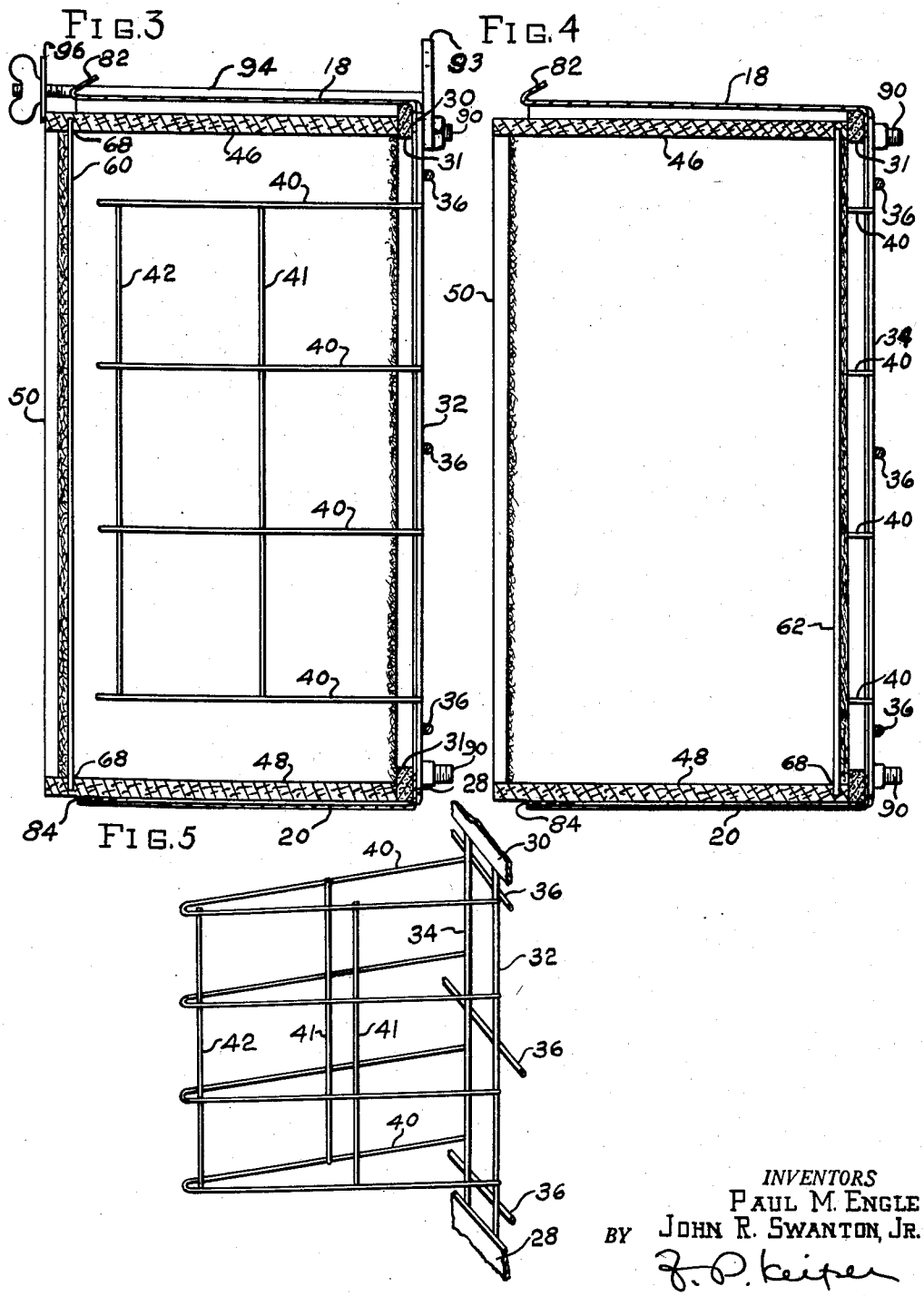

United States Patent Office 2,907,408
Patented Oct. 6, 1959

2,907,408

FILTER CONSTRUCTION

Paul M. Engle, Syracuse, N.Y., and John R. Swanton, Jr., Newton, Mass.; said Engle assignor to Cambridge Filter Manufacturing Corporation, Syracuse, N.Y., a corporation of New York, and said Swanton assignor to Arthur D. Little, Inc., Cambridge, Mass., a corporation of Massachusetts Application May 18, 1956, Serial No. 585,751

10 Claims. (Cl. 183—71)

This invention relates to space filters, and more particularly to space filters employing extended area pleated filter medium.

In space filters of the type indicated, wherein the sheet filter medium is arranged in pleated formation to extend the area of the filter medium within a given space, it is desirable to make provision for economical ready replacement of the filter medium to restore efficiency. In a co-pending application, Ser. No. 464,491, filed October 25, 1954 of which this application is a continuation in part, there is disclosed a space filter, in which there is a replaceable filter cartridge, and a separate frame and supporting structure for pleated filter medium. In filters of the type referred to, the differential pressure, due to the resistance to air or gas flow through the filter medium, exerts pressure on the sheet material normal to the surface of the medium. Such pressures tend to flex and distort the adjacent planar sections or panels of the pleats toward one another. Without a supporting structure to maintain the pleats and their respective planar sections or panels in spaced relation, such pleats may be caused to flex under pressure to such an extent that substantial portions of adjacent panels contact one another, thereby rendering ineffective a substantial part of the filter area. Without a supporting structure, the spacing of the pleats, in respect to the depth thereof may be increased to avoid such a result, but in that event, the area of filter material which may be placed in a given filter frame is substantially reduced.

It is highly desirable in filters to provide the maximum area of filter medium in a given space, and thus, in a pleated filter, it is desirable that the spacing between pleats be at a minimum in respect to the depth thereof to achieve this end. Since filter medium formed of sheet material is relatively flexible and of low tensile strength, it is not desirable to maintain the pleat panels in planar form merely by providing supports at the folds and placing such panels under tension from fold to fold. The differential pressure, which increases, with the time the filter material is in service, will tend to deform adjacent planar panels towards one another irrespective of the tension.

To add a supporting structure associated directly with the filter material to maintain the panels of the pleated form in proper spaced relation adds to the cost of such filter structure, and adds to the cost of filter unit replacement, since such support would be discarded with and as a part of the spent filter material.

The present invention is directed to the employment of a support for pleated filter medium which cooperates with the pleated filter medium during service to maintain the pleat panels in proper spaced relation, but which support is distinct and separable from the filter material. The invention is more particularly directed to a combination of a frame having a supporting grid which is complemental to the pleated filter medium and the replaceable cartridge of which the filter medium is an integral part. The invention is directed to a supporting grid structure in a supporting frame, which is complemental to the filter cartridge comprising the pleated filter material, to the end that a minimum of spacing between pleats, with a maximum depth of pleats may be employed without the danger of adjacent panels of such pleats collapsing under differential pressure against one another. The invention further is directed to the disposition of such supporting structure in a permanent supporting frame whereby replacement of the filter cartridge entails the destruction of the filter medium alone, without the loss of costly supporting structure.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 3 is a sectional view of the filter taken substantially on the line 3—3 of Figure 2;

Figure 4 is a sectional view of the filter taken substantially on the line 4—4 of Figure 2; and Figure 5 is a perspective fragmentary showing of the grid showing a single pleat supporting grid structure.

Figure 1:
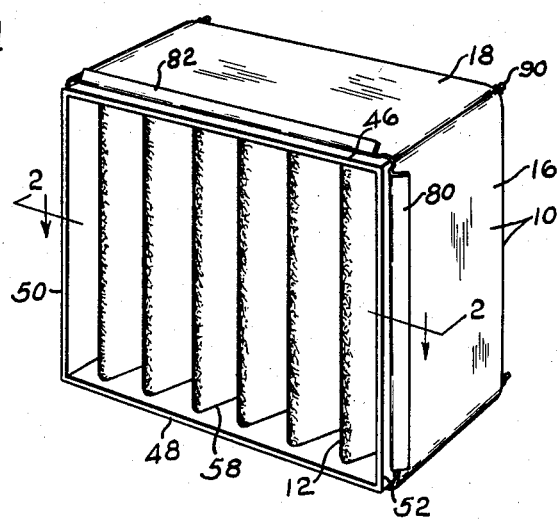
Figure 1 is a perspective view of the filter frame with a cartridge positioned therein as viewed from the upstream side.
Figure 2:
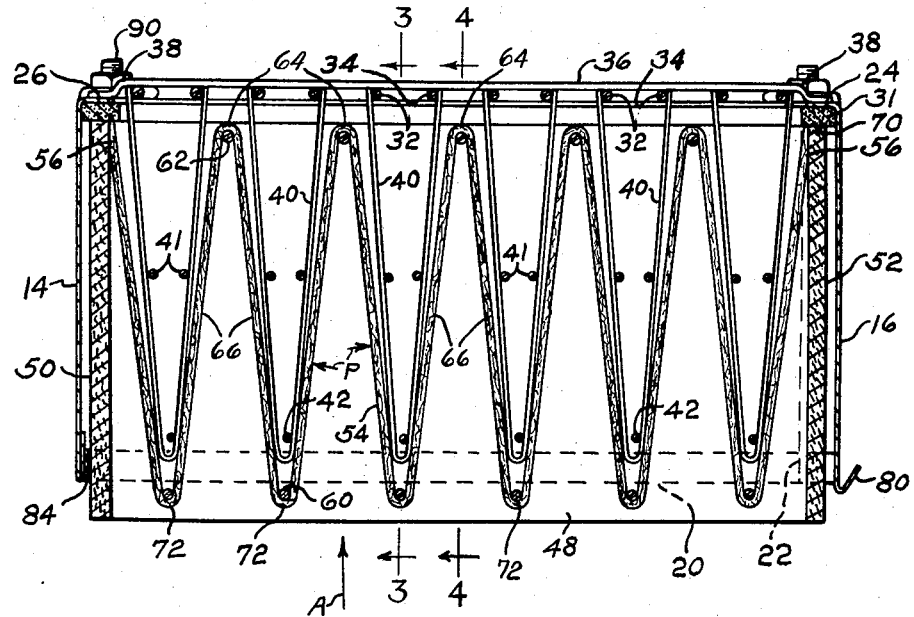
Figure 2 is a transverse sectional view of the filter taken substantially on the plane 2—2 of Figure 1.

Referring to Figures 1 and 2 there is shown a permanent supporting structure 10, of boxlike configuration, open at opposite sides, and in which is positioned a filter cartridge 12. The frame or housing may be formed of sheet metal bent to form end walls 14 and 16 and top and bottom walls 18 and 20, the sheet metal being joined by a lap joint, indicated at 22, between the bottom wall 20 and end wall 16. Each of the end and top and bottom walls are provided with inwardly extending flanges 24, 26, 28 and 30, which stiffen the walls, and form an inwardly extending rectangular shoulder. The ledge thus formed is adapted to support a soft felt rectangular gasket 31.

Affixed to the flanges 28 and 30 are a plurality of parallel bars extending across the filter frame, such bars being arranged in pairs, as is indicated at 32 and 34. The bars 32 and 34 may be reinforced by further parallel bars extending transversely thereof, such as 36, which bars are offset at their ends as at 38, and secured to the flanges 24 and 26. The pairs of bars, 32 and 34 and bars 36, in effect form a base.

Each of the pairs comprising bars 32 and 34 are provided with a plurality of V bars 40, the divergent ends of which are secured to the bars 32 and 34, the V bars extending into the filter housing. The V bars secured to a pair of bars 32 and 34 are tied together by tie bars 41 and 42 so as to rigidify the structure, and provide a supporting skeleton or grid for the panels of the pleated filter material as will appear more particularly hereinafter.

The filter cartridge is composed of a rectangular boxlike frame, open at opposite sides. In practice such frame may be formed of inexpensive corrugated board, a strip thereof being folded to form rectangular sections comprising the top, bottom and end walls, 46, 48, 50 and 52 respectively of the filter cartridge frame. The ends of such strip may be joined in any suitable manner. Within the frame thus formed is disposed a series of pleats 54 of filter media such as glass wool sheet. The ends of the strip of filter material are adhesively or otherwise secured to the inside surfaces of the end walls 50 and 52, as at 56, and the edges of the pleats are adhesively secured to the top and bottom walls 46 and 48 as at 58, it being essential that all edges of the filter material be sealed against the inside surfaces of the walls of the supporting frame. In practice, if desired, light support bars such as 60 and 62 may be disposed in the folds such as 64 and 72 of the pleats to assist in supporting the pleats in the frame, as during handling and shipment. Such bars may puncture the inner surface of the top and bottom walls 46 and 48, and be thusly embedded therein for support, as is indicated at 68.

The inner edge 70 of the cartridge frame is planar, and adapted to engage the rectangular felt seal 31. It will be seen that the number of pleats, correspond complementally with the number of sets of V rods as supported from the pairs of bars 32 and 34. It will further appear that the filter cartridge when in position, as shown in Figure 2, will form a seal with the felt gasket 31, and that air entering the filter in the direction of the arrow A, will of necessity be required to pass through the filter material. The greater pressure on the upstream side of the filter tends to distort the panels or planar sections 66 extending between each adjacent fold 64 and 72 of filter material by exerting pressure in the direction of the arrows P. Such pressure, if not opposed, would tend to collapse the portions of the adjacent panels adjacent the folds 72 against one another, and render the portions thus collapsed ineffective and sealed against the flow of air therethrough. However, the presence of the grids formed by the V bars 40, and cross bars 41 and 42 provide adequate support for the respective panels against the pressure imposed thereon, and maintain the panels spaced and effective over their entire areas, for such period of time as the filter cartridge is retained in service. Thus the tensile strength of the filter material need not be great. The degree of support desired may be provided by increasing the number of V bars, and by employing as many transverse bars 41 and 42 suitably spaced as is desired.

When it is desired to remove a cartridge, the same is readily slid from the frame, the V bars forming slides, from which the pleats of the unit are readily removed. In the same manner the replacement cartridge is guided and slid into place.

The outer housing may have two of its adjacent sides 16 and 18, provided with inbent flanges such as 80 and 82, while the inside face of the remaining adjacent sides 20 and 14 may be provided with a marginal strip 84 of rubber or the like gasket material, so that a plurality of like outer frames or housings, when arranged side by side and above one another in banked form, may be disposed with the inbent flanges of one frame overlying the edge of the adjacent frame, to form a seal with the gasket strip. On installation such inbent flanges may be pinched closed against the gasket strip of the adjacent frame or housing if desired. Also corner studs such as 90 may be provided, the same being welded to the flanges 24, 26, 28 and 30. The studs may extend through square plates (see Figure 3), 93, having four apertures therein for the reception of the corresponding studs of, for example, three adjoining frames. The plates may have extending from the center thereof a rod of suitable length, the free end of which is threaded, and upon which a clamp washer, and thumb screw is positioned. The washer may overlie the corners of the filter cartridges and hold them in place.

In practice the supporting grid bars will be welded or otherwise secured to the side wall flanges, and to each other where they cross, and the whole structure is thus one of rigid, permanent character, offering sufficient strength to support the panels of the pleated filter material. The filter cartridges may be formed of relatively inexpensive material, and the filter material itself may be selected predominantly for its filter characteristics rather than its tensile strength since adequate support is provided. The rods 60 and 62 will be of stiff material and may be only as heavy as seems desirable to support the pleats as in handling the cartridges during shipment, apart from any supporting frame. On the other hand, the housing and the grid structure will be made in a permanent manner, so as to last indefinitely. It will be apparent that with such a structure, the spacing between pleats, and the depth thereof may be such as to permit a maximum amount of filter area in a given space without danger of the adjacent pleat panels being distorted into contact in the manner referred to. The materials used in manufacturing the cartridge, aside from the filter material may thus be of negligible cost, so that upon replacing a cartridge, the material discarded is essentially the spent filter medium.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A filter support construction comprising the combination of a rectangular housing having top and bottom walls and end walls, all of rectangular configuration, said housing being open on opposite sides, a grid-like base structure extending across one of the open sides and affixed to the housing, said grid-like structure comprising a plurality of uniformly spaced pairs of parallel bars extending between the top and bottom walls, a plurality of V bars having their ends secured to the respective spaced bars of each of said pairs, said V bars extending into the housing and lying in planes parallel with the top and bottom walls and being substantially uniformly spaced from top to bottom along said pairs of bars, and spaced from said top and bottom and end walls, said V bars being adapted to provide support for the pleats of pleated filter material to prevent partial collapse thereof, and a rectangular sealing gasket disposed around all of said V bars as a group and disposed in the space between said V bars and said frame.

2. A filter support construction comprising the combination of a rectangular housing having top and bottom and end walls, said housing being open on opposite sides, a grid-like base structure extending across one of the open sides of the housing comprising spaced rods and being permanently secured thereto, and a plurality of parallelly disposed individual grid-like supporting members mounted on the base member and extending within the housing to support individual pleats of pleated filter medium, said members being of a length less than the height of said housing and being of V cross section in planes parallel with the top and bottom walls of the housing and open at their ends and each having two planar grids angularly disposed in respect to each other; and having their upper and lower ends spaced from said housing, whereby to provide clearance between the said ends and the housing to telescopically receive the frame of a filter cartridge, and a seal of rectangular form in the clearance between the frame and said supporting members as a group.

3. A filter support construction comprising the combination of a rectangular frame having at least two open sides, a grid-like base member extending across one of the open sides of the housing comprising spaced rods and permanently secured thereto, and a plurality of parallelly disposed individual grid-like supporting members each having planar grids angularly disposed in respect to each other, mounted on the base member and extending within the housing to support individual pleats of pleated filter medium, said members being of a length less than the width of said housing and open at their ends, and having their ends spaced from said frame, whereby to provide clearance between the said ends and the frame to receive the rectangular end members of a filter package, and sealing means for engaging the filter package carried by said frame and of rectangular form, and disposed wholly between the frame and said parallelly disposed supporting members as a group.

4. A filter support construction for a complemental filter cartridge having filter material arranged in pleats wherein each pleat is composed of panels requiring support against differential pressure, comprising, the combination of a rectangular housing having at least two open sides, a grid-like base member extending across one of the open sides of the housing and comprising spaced rods and being permanently secured thereto, a supporting means comprising individual pleats mounted on the base member and extending within the housing to support the panels of pleated filter medium, said first named pleats being of a length less than the width of said housing and open at their ends and each having two planar grids angularly disposed in respect to each other, and having their ends spaced from said housing, whereby to provide clearance between the said ends and the housing to receive the frame of a pleated filter cartridge.

5. A filter support construction for a complemental filter cartridge having filter material arranged in pleats, wherein each pleat is composed of panels requiring support against differential pressure, comprising, the combination of a rectangular housing having at least two open sides, a grid-like base member extending across one of the open sides of the housing and comprising spaced rods and being permanently secured thereto, a supporting means comprising individual pleats comprising bent wire rods, mounted on the base member and extending within the housing to support the panels of pleated filter medium, said supporting pleats being of a length less than the width of said housing and open at their ends and each having two planar grids angularly disposed in respect to each other, and having their ends spaced from said housing, whereby to provide clearance between the said ends and the housing to receive the frame of a pleated filter medium cartridge.

6. A filter support construction for a complemental filter cartridge having filter material arranged in pleats, wherein each pleat is composed of panels requiring support against differential pressure, comprising, the combination of a rectangular frame having at least two open sides, a grid-like base member extending across one of the open sides of the frame and comprising spaced rods and being rigidly supported thereon, and a plurality of parallelly disposed individual grid-like supporting members of V cross section mounted on the base member and extending within the frame to support the panels of the individual pleats of pleated filter medium, said members, being comprised of spaced rods, and said members being of a length less than the width of said housing and open at their ends and each having two planar grids angularly disposed in respect to each other, and having their ends spaced from said frame, whereby to provide clearance between the said ends and the frame to receive the frame of a filter cartridge.

7. A filter construction comprising the combination of a recctangular housing having top and bottom walls and end walls all of rectangular configuration, said housing being open on opposite sides, a grid-like base structure extending across one of the open sides and affixed to the housing, said grid-like structure comprising a plurality of uniformly spaced pairs of parallel bars extending between the top and bottom walls, a plurality of V bars having their ends secured to the respective spaced bars of each of said pairs, said V bars extending into the housing and lying in planes parallel with the top and bottom walls and being substantially uniformly spaced from top to bottom along said pairs of bars, and being spaced from said top and bottom and end walls, said V bars being adapted to provide V sectioned grid support means for the pleats of pleated filter material to prevent collapse thereof, and a filter cartridge comprising a rectangular frame disposed telescopically within said housing, and having pleated filter material in sheet form arranged in sealed relation with the walls of said frame and in complemental relation to said V sectioned grid support means, said cartridge being otherwise independent of said housing and grid support means.

8. A filter construction comprising the combination of a rectangular housing having top and bottom walls and end walls all of rectangular configuration, said housing being open on opposite sides, a grid-like base structure extending across one of the open sides and affixed to the housing, said grid-like structure comprising a plurality of uniformly spaced pairs of parallel bars extending between the top and bottom walls, a plurality of V bars having their ends secured to the respective spaced bars of each of said pairs, said V bars extending into the housing and lying in planes parallel with the top and bottom walls and being substantially uniformly spaced from top to bottom along said pairs of bars, and spaced from said top and bottom and end walls, said V bars being adapted to provide V sectioned grid support means for the pleats of pleated filter material against partial collapse, and a filter cartridge having a frame telescopically disposed within said housing, and pleated filter material disposed within the frame and complemental to said grid support means, said filter cartridge being otherwise independent of said housing and grid support means.

9. In filter construction, the combination of a frame having at least two open sides constituting an air inlet side and an air outlet side, a grid-like base member comprising a plurality of spaced rods extending across the outlet side of the frame and permanently secured thereto, a supporting means comprising individual pleats mounted on the base member and extending within the frame and adapted to support the individual pleats of pleated filter medium, said first named pleats being entirely open work and free of filtering material affixed thereto and being of V cross section and of a length and width less than the width of the frame and each comprising a pair of planar grid areas angularly disposed to each other, and having their ends spaced from said frame, whereby to provide clearance between the said ends, and the frame, whereby to adapt said frame to receive the frame of a filter package.

10. In filter construction, the combination of a frame having at least two open sides constituting an air inlet side and an air outlet side, a grid-like base member comprising a plurality of spaced rods extending across the outlet side of the frame and permanently secured thereto, a supporting means comprising individual pleats mounted on the base member and extending within the frame and adapted to support the individual pleats of pleated filter medium, said first named pleats being entirely open work and free of filter material affixed thereto and being of V cross section comprising bent wire rods and of a length and width less than the width of the frame and each comprising a pair of planar grid areas angularly disposed to each other, and having their ends spaced from said frame, whereby to provide clearance between the said ends, and the frame, whereby to adapt said frame to receive the frame of a filter package.

References Cited in the file of this patent

UNITED STATES PATENTS

| 1,327,287 | Miller et al. | Jan. 6, 1920 |
| 2,080,154 | Strindberg | May 11, 1937 |
| 2,479,722 | Brixius | Aug. 23, 1949 |
| 2,739,667 | Palmore | Mar. 27, 1956 |

FOREIGN PATENTS

| 312,697 | Germany | June 2, 1919 |
| 640,873 | Great Britain | Aug. 2, 1950 |